(12) United States Patent
Klassen

(10) Patent No.: US 9,242,423 B2
(45) Date of Patent: Jan. 26, 2016

(54) METHOD FOR EMBOSSING PRODUCTS WITH A ROTARY EMBOSSING DEVICE AND FOLDER GLUER HAVING A ROTARY EMBOSSING DEVICE

(71) Applicant: Heidelberger Druckmaschinen AG, Heidelberg (DE)

(72) Inventor: Erich Klassen, Gangelt (DE)

(73) Assignee: Masterwork Machinery Co., Ltd., Tianjin (CN)

( * ) Notice: Subject to any disclaimer, the term of this patent is extended or adjusted under 35 U.S.C. 154(b) by 632 days.

(21) Appl. No.: 13/661,068

(22) Filed: Oct. 26, 2012

(65) Prior Publication Data

US 2013/0106019 A1   May 2, 2013

(30) Foreign Application Priority Data

Oct. 26, 2011   (DE) .................. 10 2011 117 019

(51) Int. Cl.
| | |
|---|---|
| *B29C 59/04* | (2006.01) |
| *B31B 1/88* | (2006.01) |
| *B41M 1/24* | (2006.01) |
| *B41M 3/16* | (2006.01) |
| *B31F 1/07* | (2006.01) |
| *B41J 3/32* | (2006.01) |
| *G09B 21/02* | (2006.01) |

(52) U.S. Cl.
CPC ... *B31B 1/88* (2013.01); *B31F 1/07* (2013.01); *B41J 3/32* (2013.01); *B41M 1/24* (2013.01); *B41M 3/16* (2013.01); *G09B 21/02* (2013.01); *B31B 2201/6008* (2013.01); *B31B 2201/88* (2013.01); *B31B 2201/95* (2013.01); *B31B 2203/00* (2013.01); *B31F 2201/0738* (2013.01); *B31F 2201/0748* (2013.01); *B31F 2201/0779* (2013.01); *B31F 2201/0792* (2013.01)

(58) Field of Classification Search
None
See application file for complete search history.

(56) References Cited

U.S. PATENT DOCUMENTS

| | | | | | |
|---|---|---|---|---|---|
| 1,347,305 | A | * | 7/1920 | Taylor | 318/39 |
| 4,363,271 | A | * | 12/1982 | Horst | 101/181 |
| 5,467,708 | A | * | 11/1995 | Kildune | 101/32 |
| 7,594,372 | B2 | * | 9/2009 | Micnerski | 53/453 |
| 7,794,379 | B2 | | 9/2010 | Diehr et al. | |
| 2005/0051044 | A1 | * | 3/2005 | Damm et al. | 101/474 |
| 2006/0198920 | A1 | * | 9/2006 | Spirito et al. | 425/385 |
| 2009/0050001 | A1 | | 2/2009 | Boegli | |
| 2010/0236431 | A1 | | 9/2010 | Roberts et al. | |

FOREIGN PATENT DOCUMENTS

| | | |
|---|---|---|
| DE | 10 2005 056 627 A1 | 5/2007 |
| DE | 10 2007 060 581 A1 | 6/2009 |
| DE | 10 2007 060 613 A1 | 6/2009 |

(Continued)

OTHER PUBLICATIONS

German Patent and Trademark Office Search Report Dated Jul. 19, 2012.

*Primary Examiner* — Mark A Osele
(74) *Attorney, Agent, or Firm* — Lawrence A. Greenberg; Werner H. Stemer; Ralph E. Locher

(57) ABSTRACT

A method for embossing products with a rotary embossing device includes controlling the rotation of at least one embossing roller as a function of marks that are present on the products and are detected by sensors. A folder gluer having a rotary embossing device is also provided.

9 Claims, 3 Drawing Sheets

(56) References Cited

FOREIGN PATENT DOCUMENTS

| DE | 10 2009 030 069 A1 | | 12/2010 |
|---|---|---|---|
| EP | 1 920 910 A1 | | 5/2008 |
| EP | 2 027 994 A2 | | 2/2009 |
| JP | 56080439 A | * | 7/1981 |
| JP | 01042218 A | * | 2/1989 |
| WO | 2008/114018 A2 | | 9/2008 |
| WO | 2010/149268 A1 | | 12/2010 |

* cited by examiner

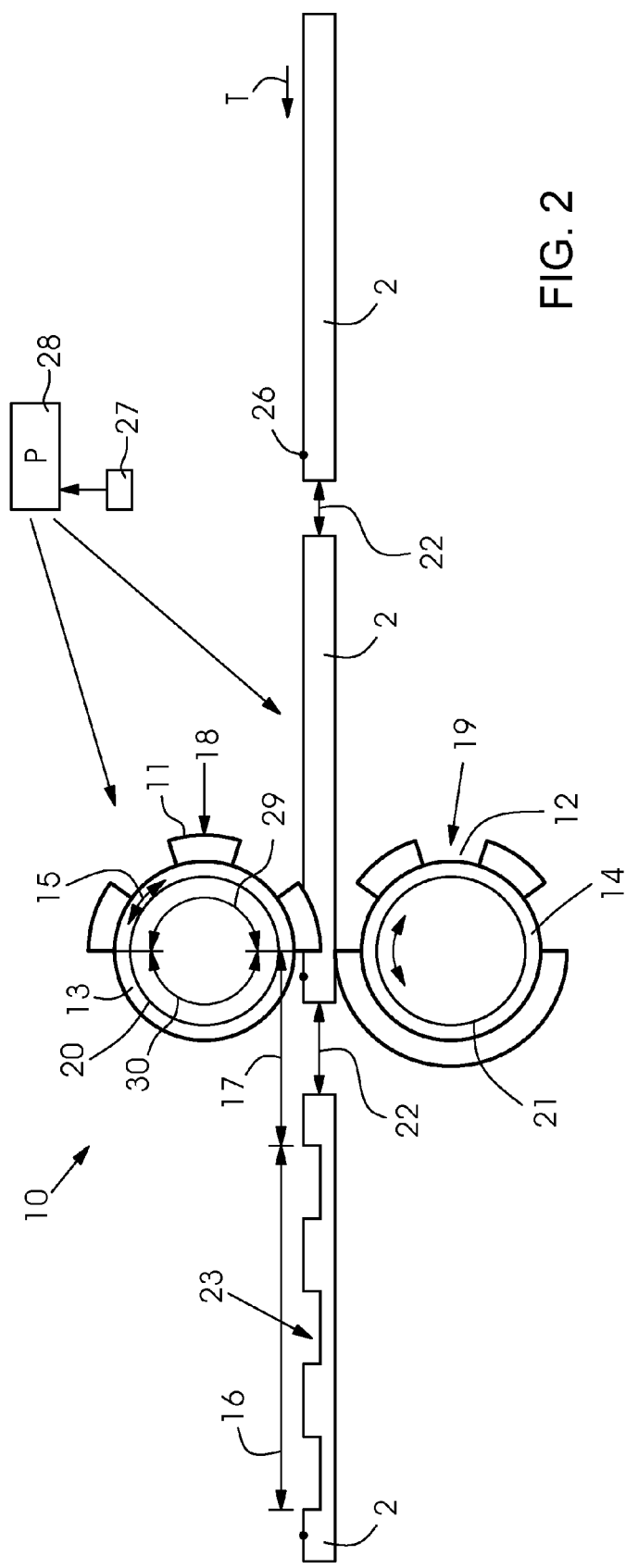

METHOD FOR EMBOSSING PRODUCTS WITH A ROTARY EMBOSSING DEVICE AND FOLDER GLUER HAVING A ROTARY EMBOSSING DEVICE

CROSS-REFERENCE TO RELATED APPLICATION

This application claims the priority, under 35 U.S.C. §119, of German Patent Application DE 10 2011 117 019.0, filed Oct. 26, 2011; the prior application is herewith incorporated by reference in its entirety.

BACKGROUND OF THE INVENTION

Field of the Invention

The present invention relates to a method for embossing products with a rotary embossing device. The invention also relates to a folder gluer or folding box gluing machine having a rotary embossing device.

Folding boxes are packaging made of cardboard, in particular of corrugated cardboard or, on a limited scale, of plastic. Depending on the structure of the folding box, glue is applied to one or more locations during the folding process. As a rule, folding boxes are made from blanks, which are usually cut in a sheet-fed diecutting machine. The blank needs to be glued on at least one edge. When the folded boxes exit the folder-gluer, they are flat. The boxes are then set up or assembled and filled either in a machine or by hand.

In addition to the folds that are necessary to create the folding boxes, further crease lines are pre-folded in the folder-gluer to prepare for the following production step. The pre-folding operation simplifies the set up or assembly of the box and the subsequent filling operation.

If the folding boxes are used for packaging pharmaceuticals, the law requires that the name of the product be applied to the folding box in Braille letters for the blind (for example by embossing).

In accordance with the prior art, the Braille letters are embossed either in the course of the diecutting process in the sheet-fed diecutting machine or during the production of the blanks. However, that is a complex process since one diecutting sheet contains multiple blanks and for each blank, a pair of tools including a female tool and a male tool needs to be provided. Alternatively, the Braille letters may be produced by rotary embossing devices that include two rotating embossing tools and may be part of a folder-gluer as described in U.S. Pat. No. 7,794,379 B2. In order to be able to produce the embossment in the correct position on the folding box blank, the rotary tools need to be synchronized with the folding box blank. In particular, in order to create Braille characters in folding box blanks, the synchronization needs to be very accurate. Due to the mass inertia of the female tool, the male tool and the rotary drive, the required degree of accuracy of the synchronization is difficult or even impossible to achieve. In addition, the productivity is limited due to the fact that the rotary embossing device is impossible to adapt to the size of the product to be processed.

German Patent Application DE 10 2007 060 581 A1 discloses a rotary embossing device in which the duration of a so-called asynchronous phase is defined by the extension of the embossment to be created and the speed of the male and female tools. Since there is a distance between the male tool and the folding box blank in the asynchronous phase, it is possible to position and thus to synchronize the embossing die of the male tool relative to the position of a folding box blank surface to be embossed.

German Patent Application DE 10 2007 060 613 A1 discloses a rotary embossing device in which the male tool rolls on the folding box blank in the region of an embossing segment only during the embossing operation to create the embossment. Before and after the embossing operation, the male tool is not in contact with the folding box blank. During that window of time, which is also referred to as the asynchronous phase, the male tool can be accelerated and decelerated in order to be able to synchronize, i.e. align, the embossing segment, which is equipped with embossing dies, relative to the position of a folding box blank surface that is to be embossed.

Since prior art embossing devices operate according to that simple start/stop mode of operation, their productivity and accuracy are limited.

SUMMARY OF THE INVENTION

It is accordingly an object of the invention to provide a method for embossing products with a rotary embossing device and a folder gluer having a rotary embossing device, which overcome the hereinafore-mentioned disadvantages of the heretofore-known methods and devices of this general type and which attain greater productivity and accuracy.

With the foregoing and other objects in view there is provided, in accordance with the invention, a method for embossing products with a rotary embossing device, which comprises using a sensor to detect marks, at least a respective one of which is disposed on each product to be embossed. The rotary movement of at least one embossing roller is controlled based on signals emitted by the sensor.

Through the use of the method of the invention, the products to be embossed may be transported through the embossing device in quick succession, thus increasing productivity. Despite the high speed, it is possible to position the embossment on the products with a high degree of accuracy.

The sensor may be a touch-free sensor such as an optical sensor. The marks may be printed onto the products or may be features that are present on the products in any case such as product edges, for instance the leading product edge.

The products may be printed sheets, for instance sheets of cardboard, or folding box blanks. The embossing operation may include providing the product with Braille characters. The rotary movement of the embossing roller may be controlled in such a way that the roller rotates non-uniformly. The embossing roller may be equipped with a female embossing tool or a male embossing tool.

In accordance with another mode of the invention, the rotary movement of the embossing roller is controlled in such a way that the latter alternatingly rotates in a first direction, for instance the clockwise direction, and in a second direction, for instance in a counter-clockwise direction. In this case, the embossing roller does not complete a 360° revolution. That is to say, the embossing roller carries out a reciprocating movement, being rotated in the first direction during each embossing operation and in the second direction in between the respective embossing operations.

In accordance with a further mode of the invention, the products are successively moved past the embossing roller in a line or row, with each product being provided with at least one embossment by the embossing roller in the process. The embossment does not extend across the entire length of the product, but only across an embossment section. When the embossment section is located opposite the embossing roller or when the embossment section passes the embossing roller, the embossing roller is rotated in the first direction. When the product section that is not to be embossed and/or a gap between successive products passes the embossing roller, the embossing roller is rotated in the second direction. The section that is not to be embossed and the gap between products form a so-called embossing gap.

In accordance with an added mode of the invention, the circumference of the embossing roller is subdivided into a first circumferential section and a second circumferential section. Only the first circumferential section is equipped with tools such as dies or holes for embossing. The first circumferential section may be referred to as the synchronous area or section. The second circumferential section does not carry any tool and may be referred to as the asynchronous section. If the first circumferential section extends over an angle of 120°, the second circumferential section extends over the remaining 240°. Each time an embossing gap passes, the embossing roller rotates in the second direction at the maximum up to an angular limit. The angular limit corresponds to one half of the length of the second circumferential section. If the length of the second circumferential section is 240° as in the example given above, the angular limit is 120°. Multiple synchronous areas and multiple asynchronous areas amounting to 360° in total may be distributed over the total length of the circumference.

In accordance with an additional mode of the invention, a respective product gap is present between the trailing edge of the leading product and the leading edge of the product that immediately follows in the line or row of products. The size of the distance, i.e. of the product gap, varies from gap to gap in the row.

In accordance with yet another mode of the invention, the rotation of the embossing roller is controlled by a control device in which movement curves or movement functions are stored or calculated. The movement functions differ from each other. The movement functions may differ, for example, in terms of their function types.

In accordance with yet an added mode of the invention that is advantageous in terms of automation, a program running in the control device selects, for example calculates, a suitable movement function for each product gap. Depending on the signals of the sensor, the control device or the program running therein selects a different movement function for the subsequent product gap than for the previous product gap.

Depending on the selected movement functions, when a leading product gap passes, the control device controls the rotation of the embossing roller in accordance with the one movement function, and when a subsequent product gap passes, the control device controls the rotation of the embossing roller in accordance with the other movement function.

In accordance with yet an additional mode of the invention that is advantageous in view of a harmonious movement, the movement functions are polynomial functions of different degrees, and when a product gap passes, the rotation of the embossing roller is controlled in accordance with a polynomial function of a lower degree and when another product gap passes, the rotation of the embossing roller is controlled in accordance with a polynomial function of a higher degree. For example, when a leading product gap passes, the rotation of the embossing roller is controlled in accordance with a fifth-degree polynomial function, and when the subsequent product gap passes, the rotation of the embossing roller is controlled in accordance with a seventh-degree polynomial function.

In accordance with again another mode of the invention, the aforementioned embossing roller cooperates with a further embossing roller to emboss the products. In this case, in accordance with one variant, the embossing roller may be a male roller and the further roller may be a female roller. In accordance with a different variant, the embossing roller may be a female roller and the further embossing roller may be male roller. The synchronization of the rotary movements of the two embossing rollers with each other takes precedence over the synchronization of the rotary movement of the embossing rollers and the transporting movement of the products. In controlling the rotary movement of the embossing rollers, the control device takes into account the fact that the synchronous running of the embossing rollers is more important than the synchronous running of the embossing rollers relative to the transporting movement of the products or product transport device. This means, for example, that the synchronization process accepts positional deviations between the position of the embossing dies of the male roller and/or of the holes in the female roller relative to the leading edge of the respective product to be embossed if this is necessary to ensure a sufficiently accurate coincidence or engagement between the dies and holes.

With the objects of the invention in view, there is also provided a rotary embossing device, comprising an electronic control device containing a program for implementing the method of the invention or one of the further developments thereof.

With the objects of the invention in view, there is concomitantly provided a folder-gluer equipped with such a rotary embossing device.

Other features which are considered as characteristic for the invention are set forth in the appended claims.

Although the invention is illustrated and described herein as embodied in a method for embossing products using a rotary embossing device and a folder gluer having a rotary embossing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is an enlarged, longitudinal-sectional view of a rotary embossing device of the folder gluer shown in FIG. 1.

DETAILED DESCRIPTION OF THE INVENTION

Figure 1:
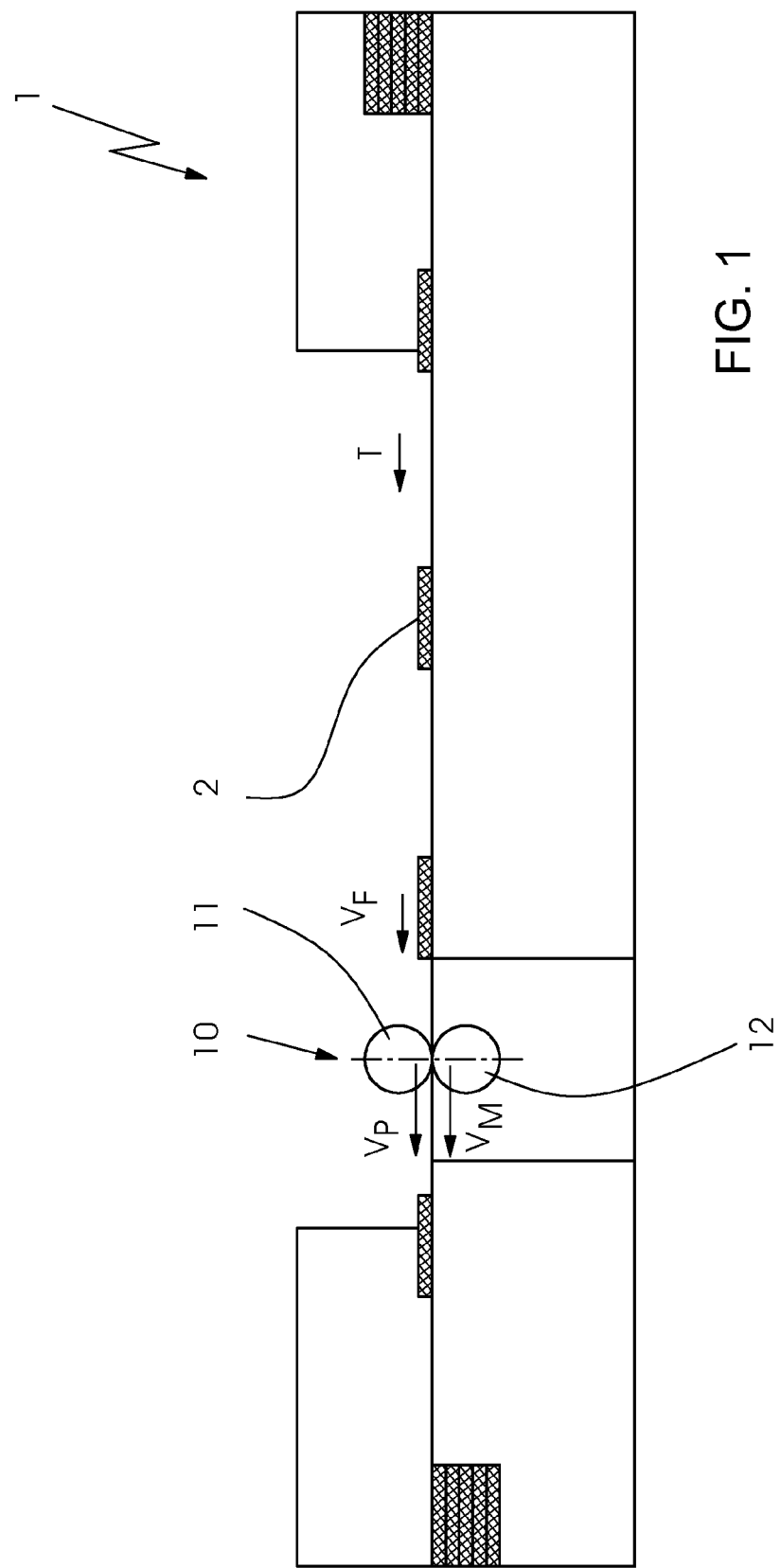
FIG. 1 is a diagrammatic, longitudinal-sectional view of a folder gluer.

Referring now to the figures of the drawings in detail and first, particularly, to FIG. 1 thereof, there is seen a folder-gluer 1 including a rotary embossing device 10. Folding box blanks 2 that constitute products to be embossed are transported in a direction of transport T from a feeder through the folder-gluer 1 and through the rotary embossing device 10 to a delivery. The rotary embossing device 10 includes a first embossing roller 13 carrying a male tool 11 and a second embossing roller 14 carrying a female tool 12 to create embossments in the folding box blanks 2, as seen in FIG. 2. The folding box blanks 2 are moved at a speed vF.

The speed of the male tool 11 is vP, in a line of contact between the male tool 11 and the folding box blank 2 during the embossing operation. The speed of the female tool 12 is vM, in a line of contact between the female tool 12 and the folding box blank 2 during the embossing operation. During the embossing operation, the speeds vP of the male tool, vM of the female tool and vF of the folding box blank have the same magnitude. Thus, there is no relative movement between the tools 11, 12 and the folding box blank 2 and any marking of the folding box blank is avoided. For this purpose, the male tool 11 and the female tool 12 need to be synchronized with each other in terms of their speed. Moreover, the two embossing tools, i.e. the male tool 11 and the female tool 12, need to be synchronized with each other in terms of their angular positions, i.e. dies 18 (see FIG. 2) of the male tool 11 must fit into holes 19 (see FIG. 2) formed in the female tool 12. If each of the male tool 11 and the female tool 12 is equipped with its own embossing tool drive 20, 21, the synchronization is achieved electronically.

As is shown in FIG. 2, the rotary embossing device 10 includes an electronic control device 28 for controlling the first embossing tool drive 20 and the second embossing tool drive 21. A mark 26, such as a cross, is printed onto each folding box blank 2 to be detected by a sensor 27 of the control device 28. The control device 28 can calculate the size of product gaps 22 between the folding box blanks 2 based on the detected marks 26. The first embossing roller 13 has a first circumferential section 29 and a second circumferential section 30. The dies 18, which are the embossing tools of the first embossing rollers 13, are only provided in the first circumferential section 29. A developed view or flat projection of the first circumferential section 29 corresponds to an embossment section 16 of the respective folding-box blank 2. Embossment(s) 23 are only introduced within the embossment section 16, having a length which is to be measured in the direction of transport T. Embossing gaps 17 are formed between the embossment sections 16 of the folding box blanks 2. An embossing gap 17 is defined as the distance between the trailing end of the embossment section 16 of the leading folding box blank 2 and the leading end of the embossment section 16 of the trailing folding box blank 2. For reasons inherent to the system, the size of the product gaps 22 varies from one product gap 22 to the next product gap 22. In FIG. 2, for example, the product gap 22 between the left-hand folding box blank 2 and the central folding box blank 2 is greater than the product gap 22 between the central folding box blank 2 and the right-hand folding box blank 2. Since the size of the product gaps 22 varies for reasons inherent to the system, the size of the embossing gaps 17 varies, too. In order to accommodate this fact, i.e. the varying size of the product gaps, and to ensure that the angular position of the dies 18 precisely coincides with that of the holes 19 of the second embossing roller 14, the control device 28 controls the first embossing tool drive 20 in such a way that in specific situations, the first embossing tool drive 20 even moves the first embossing roller 13 in accordance with a reciprocating movement 15 to compensate between the movement of the second circumferential section 30 and the movement of the embossing gap 17. The second embossing tool drive 21 is likewise controlled accordingly to cause the second embossing roller 14 to carry out a reciprocating movement. A program P that contains different movement functions 24, 25 (see FIGS. 3A and 3B) to assist in implementing the reciprocating movement 15 is stored in the control device 28.

Figure 3B:
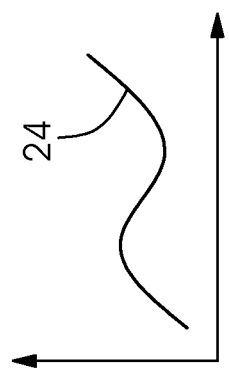
FIGS. 3A and 3B are diagrammatic representations of movement functions for controlling the rotary embossing device shown in FIG. 2.
Figure 3A:
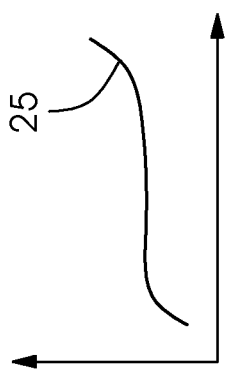

The diagrams shown in FIGS. 3A and 3B illustrate the angle of rotation of the first embossing roller 13 as a function of a so-called machine angle of the folder gluer 1 or as a function of the transporting movement T of a (non-illustrated) transport device that transports the folding box blanks 2. The two movement functions 24, 25, which are illustrated in a highly diagrammatical way, are polynomial functions. Polynomial function 24 is of a different degree than polynomial function 25. Polynomial function 24 may be a polynomial function of the fifth degree and polynomial function 25 may be a polynomial function of the seventh degree.

The illustrated rotary embossing device 10 operates as follows:

When the machine is set up, the embossment position and the embossment length are predetermined in the specifications of the product. Settings are made to specify the distance between the leading edge of a respective folding box blank 2 and the leading edge of the embossment section 16 as well as the length of the embossment section 16. During operation, the embossment position is maintained at an accuracy of ±1 millimeter through the use of the closed-loop control based on the marks 26. In terms of control technology, the products (folding box blanks 2) form a so-called "master" and the embossing rollers 13, 14 form so-called "slaves." The embossing rollers 13, 14—the slaves—are synchronized in a positionally accurate way and controlled by the marks 26 with the passing product—the master—in accordance with the master/slave technology. Following each embossing operation, the slaves move or rotate into their stand-by position, preferably controlled in accordance with the traveled distance of the master rather than based on the passage of time. If, due to the rapid succession of products, a slave has not reached its stand-by position by the time the next product arrives, the embossing rollers 13, 14 are newly synchronized with the following product while in motion. The succession of products may vary while the length of the products is constant. Thus, the size of the product gap 22 varies. The machine has a high productivity of 100,000 folding box blanks per hour. At a maximum production speed of 5 millimeters per millisecond, the cycle time is as low as 36 milliseconds. This cycle time can only be attained at a specific ratio between synchronous phase and asynchronous phase. When the machine operates at this cycle, the slaves do not reach their stand-by position; rather, they are re-synchronized immediately after each synchronous phase. The synchronization occurs in the starting point of the synchronized phase without any jolt. The uncoupling of the slaves in controlling terms after the synchronous phase of the last product to be embossed is implemented in accordance with the same law of motion as the coupling of the slaves to the master for the first product to be embossed after the slaves were at a standstill. For the uncoupling process, the motion profile for moving into the stand-by position is defined in a polynomial calculation based on the distance traveled by the master. The polynomial calculation is made by the control device 28 in accordance with the program P. If polynomial calculations are used as the movement functions 24, 25, particularly large product gaps 22 that exceed a critical length may result in a reverse rotation of the embossing rollers 13, 14, thus creating the reciprocating movement 15 (reversing operation). This reverse rotation is acceptable up to a selectable (angular) limit. The limit is one half of the difference formed by the circumferential length of the respective embossing roller 13, 14 and the length of the embossment section 16. The reverse rotation advantageously results in an extension of the length of the subsequent movement of the embossing rollers 13, 14 in the original direction. It is likewise possible to cause the respective embossing roller 13, 14 to temporarily remain in the stand-by position when a product gap 22 exceeds the critical length.

What is even more important than the synchronization between the slaves relative to the master and thus the position of the embossment 23 on the respective folding box blank 2, is the synchronization between the two slaves. For instance, if the diameter of the embossing rollers 13, 14 is 130 millimeters, the two embossing rollers 13, 14 need to be synchronized within a tolerance of ±0.2 millimeters measurable along the circumference of the roller. Due to the varying power dynamics between the two embossing rollers 13, 14, in controlling terms these two slaves or their embossing tool drives 20, 21 need to be cross-coupled. Any deviation from the synchronization between one slave and the master is transmitted to the other slave by the control device 28 in order for the other slave to follow that deviation. For instance, in an extreme case, the control device 28 controls the one embossing tool drive 20, 21 relative to the other in such a way that when one embossing roller stops rotating, the rotation of the other embossing roller is likewise stopped in a synchronous movement.

The advantages of the invention are a harmonious movement based on the asynchronous phase that is adapted in an online process to the measured product distance. A re-calculation of the applied curves (movement functions 24, 25) from product to product using high-degree polynomials may preferably be made in real time. A reciprocating movement 15 of the embossing rollers 13, 14 at a variable angle of reciprocation is implemented, thus even further reducing the dynamics.

The invention claimed is:

1. A method for embossing products with a rotary embossing device, the method comprising the following steps:
    controlling a rotation of at least one embossing roller as a function of a sensor detection of marks disposed on the products;
    alternatingly rotating the at least one embossing roller in a first direction and in a second direction corresponding to a reciprocating movement, in which the at least one embossing roller does not carry out a full revolution during the reciprocating movement; and
    rotating the at least one embossing roller in the first direction during each embossing operation and in the second direction between embossing operations.

2. The method according to claim 1, which further comprises:
    successively transporting the products past the at least one embossing roller and providing the products with embossments within embossment sections using the at least one embossing roller;
    rotating the at least one embossing roller in the first direction each time an embossment section passes;
    forming a respective embossing gap between an embossment section of a leading product and an embossment section of a trailing product; and
    rotating the at least one embossing roller in the second direction each time an embossing gap passes.

3. The method according to claim 1, which further comprises:
    providing the at least one embossing roller with a total circumferential length including a first circumferential section and a second circumferential section;
    providing the at least one embossing roller with embossing tools all being exclusively located in the first circumferential section; and
    carrying out each rotation of the at least one embossing roller in the second direction only as far as an angular limit corresponding to one half of the circumferential length of the second circumferential section.

4. The method according to claim 1, which further comprises transporting the products past the at least one embossing roller in a row with product gaps of varying size formed between the products.

5. The method according to claim 4, which further comprises controlling the rotation of the at least one embossing roller in accordance with movement functions differing from each other from product gap to product gap.

6. The method according to claim 5, which further comprises automatically selecting a suitable movement function for each of the product gaps.

7. The method according to claim 6, which further comprises:
    selecting the movement functions as polynomial functions of different degrees;
    controlling the rotation of the at least one embossing roller in accordance with a polynomial function of a lower degree when one of the product gaps passes; and
    controlling the rotation of the at least one embossing roller in accordance with a polynomial function of a higher degree when another one of the product gaps passes.

8. The method according to claim 1, which further comprises:
    providing a further embossing roller cooperating with the at least one embossing roller;
    providing the two embossing rollers respectively as a female roller and a male roller; and
    providing a synchronization between the rotation of the further embossing roller and the rotation of the at least one embossing roller with precedence over a synchronization between the rotation of the further embossing roller and a transporting movement of the products.

9. A folder gluer, comprising:
a rotary embossing device; and
a programmable control device having a program configured to control said rotary embossing device in accordance with the method of claim 1.

* * * * *